United States Patent [19]

Lance

[11] Patent Number: 5,788,328
[45] Date of Patent: Aug. 4, 1998

[54] LUMBAR SUPPORT ADJUSTMENT

[75] Inventor: Mark Andrew Lance, Victoria, Australia

[73] Assignee: Henderson's Industries Pty. Ltd., Australia

[21] Appl. No.: 535,142
[22] PCT Filed: Apr. 27, 1994
[86] PCT No.: PCT/AU94/00216
§ 371 Date: Jan. 3, 1996
§ 102(e) Date: Jan. 3, 1996
[87] PCT Pub. No.: WO94/24904
PCT Pub. Date: Nov. 10, 1994

[30] Foreign Application Priority Data

Apr. 30, 1993 [AU] Australia ................. PL8564

[51] Int. Cl.⁶ ................. A47C 7/46; B60N 2/22
[52] U.S. Cl. ................. 297/284.4; 297/284.8; 74/502.4; 74/502.6
[58] Field of Search ................. 297/284.4, 284.2, 297/284.8

[56] References Cited

U.S. PATENT DOCUMENTS

| 4,895,041 | 1/1990 | Cunningham | 74/502.4 |
| 5,217,278 | 6/1993 | Harrison et al. | 297/284.4 X |
| 5,261,293 | 11/1993 | Kelly | 74/502.4 X |
| 5,507,559 | 4/1996 | Lance | 297/284.4 X |

FOREIGN PATENT DOCUMENTS

| 0 296 938 | 12/1988 | European Pat. Off. . | |
| 0 518 830 A1 | 12/1992 | European Pat. Off. . | |
| 0 540 481 A1 | 5/1993 | European Pat. Off. . | |
| 540481 | 5/1993 | European Pat. Off. | 297/284.4 |
| 38 17 977 A1 | 11/1989 | Germany . | |
| 360516 | 11/1931 | United Kingdom | 297/284.4 |
| WO 89/09005 | 10/1989 | WIPO . | |
| WO 92/17096 | 10/1992 | WIPO . | |
| 9305683 | 4/1993 | WIPO . | |
| WO 93/05683 | 4/1993 | WIPO . | |
| 4008492 | 4/1994 | WIPO | 297/284.4 |

Primary Examiner—Peter M. Cuomo
Assistant Examiner—David E. Allred
Attorney, Agent, or Firm—Lerner, David, Littenberg, Krumholz & Mentlik

[57] ABSTRACT

An adjustable lumbar support which includes an elongate flexible band arranged to extend between and be connected to opposite sides of a seat back rest. The connection with the seat back rest and least one end of the band is such that the end of the band is movable in the longitudinal direction of the band relative to the seat back rest so as to vary the degree to which the band curves rearwardly. Control of that movement is effected through a flexible cable connected to the band at one end and connected to an actuator at its opposite end. The cable has a tubular cover and a wire core slidable longitudinally within the cover, and the cable connections are such that the wire core forms a static part of a drive connection between the band and the actuator, and the cable cover forms a dynamic part of that connection. It is preferred that a respective cable is connected to each end of the band, and that each of those cables is connected to a common actuator.

18 Claims, 7 Drawing Sheets

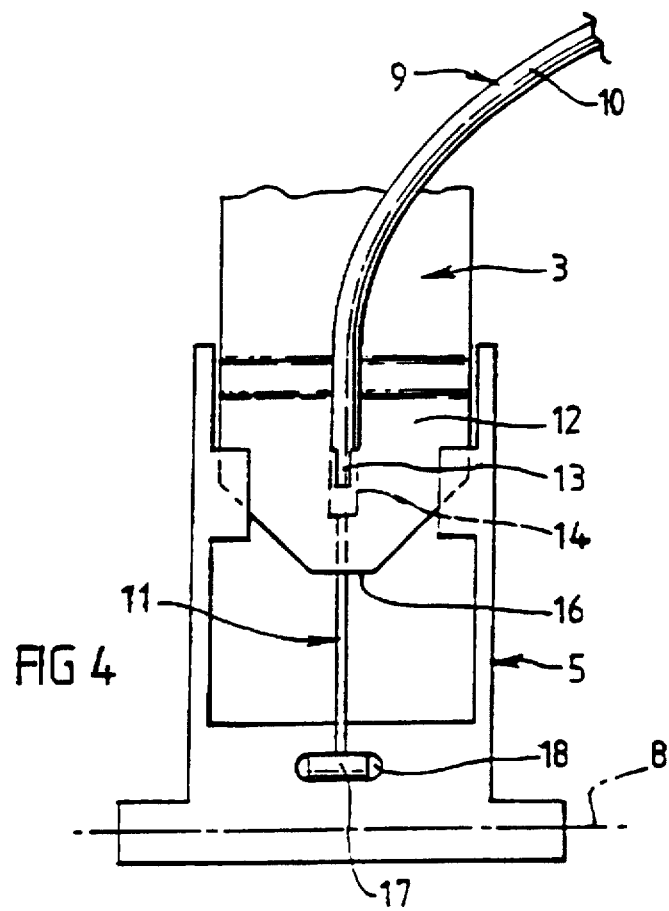
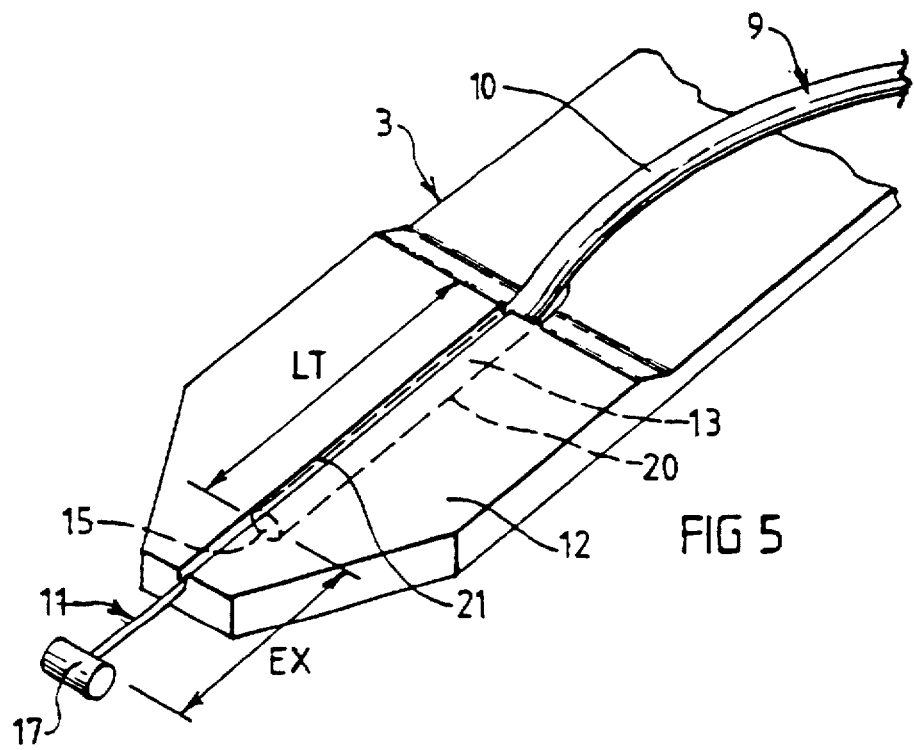

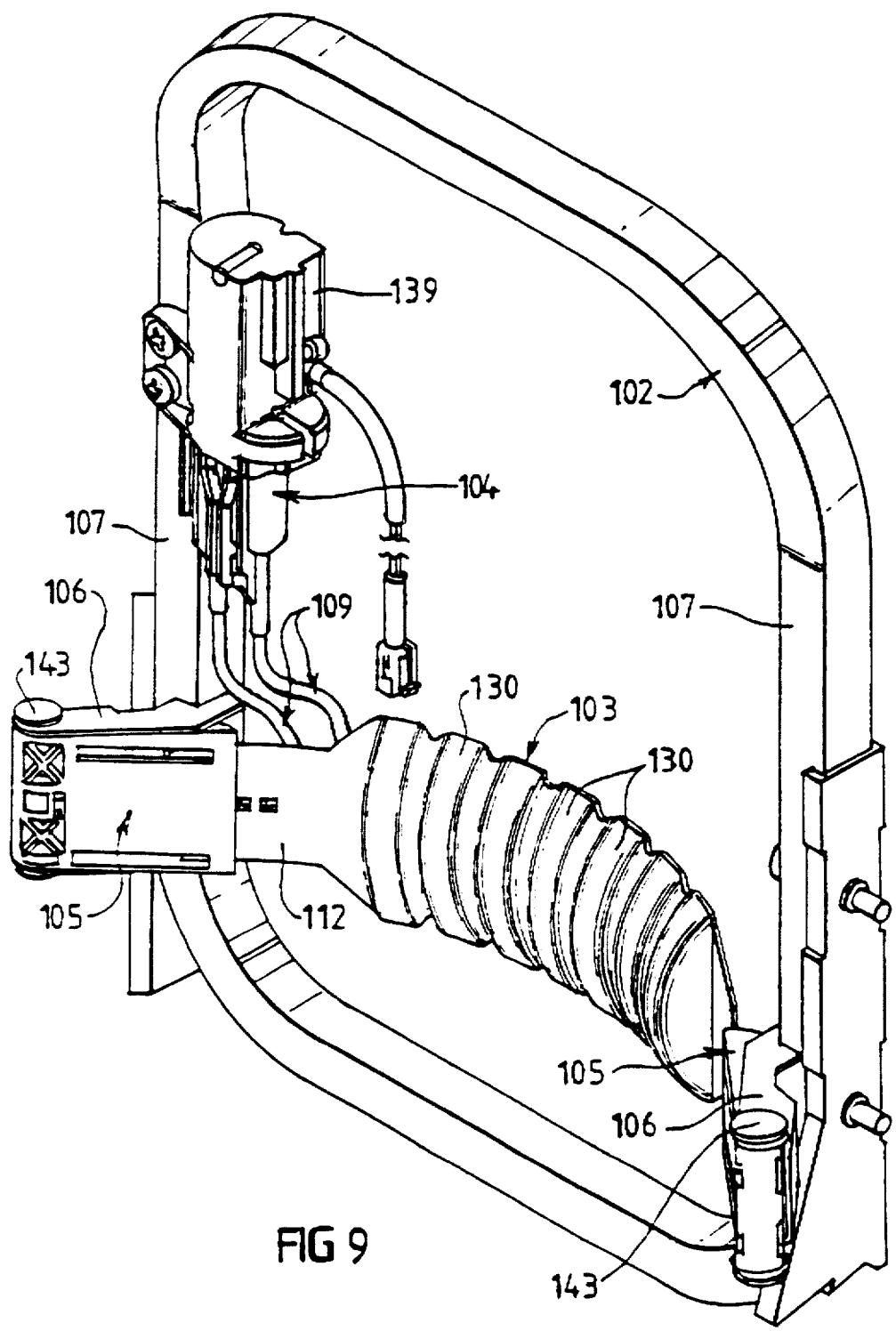

LUMBAR SUPPORT ADJUSTMENT

FIELD OF THE INVENTION

This invention relates to adjustable lumbar supports for seats and chairs, and is particularly although not exclusively concerned with such supports as used in association with motor vehicle seats. It will be convenient to hereinafter describe the invention with particular reference to motor vehicle seats, but it is to be understood that the invention has wider application. By way of example, the invention may be adopted in aircraft seats, train seats, shipboard seats, and chairs as used for office or recreational purposes.

BACKGROUND OF THE INVENTION

Adjustable lumbar supports have achieved wide adoption in motor vehicles, particularly for the driver's seat, because of their significant contribution to driver comfort. A wide variety of such supports are available, and they generally suffer from one or more problems. Complexity of construction and consequent expense is a common problem, and less complicated and less expensive systems are usually deficient in operation. Another problem is the relatively high level of effort required to effect adjustment of such supports. Yet another problem is the limited degree of adjustment movement which is available with some lumbar supports.

It is an object of the present invention to provide an improved adjustable lumbar support, and particularly such a support which is relatively easy to operate. It is yet another object of the invention to provide an improved lumbar support of the kind which utilises a flexible cable in the adjustment mechanism. A further object of the invention is to provide an improved sub-assembly for use in a lumbar support system.

Flexible cable is used in some lumbar support systems to connect the actuator of the adjustment mechanism with the lumbar support member or unit to be adjusted. Such cable generally includes a tubular cover and a flexible wire core which extends axially through the bore of the cover and is slidable longitudinally relative to the cover. It is conventional practice to arrange the cable so that the cover is a static part of the adjustment mechanism and the wire core is a dynamic part of that mechanism. In particular, the wire core is connected to the member or unit to be adjusted so as to move with that member or unit as it is adjusted.

SUMMARY OF THE INVENTION

A lumbar support according to the present invention is characterized in that it uses a flexible cable in the adjustment mechanism and that the wire core and tubular cover are static and dynamic parts respectively of that mechanism.

The invention is applicable to a wide variety of adjustable lumbar supports, but it will be convenient to hereinafter describe the invention with particular reference to such a support having a flexible strap-like member as the adjustable member of the support. A support of that kind is described in Patent Application PCT/AU92/00503, but that is not the only configuration of such a system to which the invention is applicable.

According to one aspect of the present invention there is provided an adjustable lumbar support including, an elongate flexible band which in use extends longitudinally between two opposite sides of a seat back rest, a flexible cable including a tubular cover and a wire core slidably located within said cover, an end portion of said cover having its longitudinal axis generally parallel to the longitudinal axis of said band, a connection between said band and said cover end portion preventing said cover end portion moving longitudinally in one direction relative to said band, an end portion of said wire core extending in said one direction beyond said cover end portion and being connectable to a said side of the seat back rest, and the end of said wire core remote from said core end portion is connectable to an actuator which is operable to move or allow movement of said cover longitudinally relative to said core.

According to a further aspect of the invention there is provided a seat sub-assembly including, a seat back rest having two laterally spaced frame members, an adjustable lumbar support having an elongate flexible band which extends longitudinally between and is connected to said members, and lumbar support adjustment means including a flexible cable having a tubular cover and a wire core slidable longitudinally within said cover, an end portion of said cover connected to said band so that the cover end portion is thereby prevented from moving relative to said band in one direction longitudinal of said band, an end portion of said core extending in said one direction beyond said cover end portion, and a connection between said core end portion and a said member, wherein the end of said core remote from said core end portion is connectable to an actuator which is operable to move or allow movement of said cover longitudinally relative to said core so as to thereby vary the length of said core end portion extending between said connection and said cover end portion.

In a preferred form of either aspect of the invention, both ends of the flexible band are adjustable and a respective one of two flexible cables is associated with each end of the band. Each of those cables may be connected to a common actuator which is operable to cause simultaneous adjustment at both ends of the band. The actuator may be manually driven or it may be power driven such as through an electric motor.

Embodiments of the invention are described in detail in the following passages of the specification which refer to the accompanying drawings. The drawings, however, are merely illustrative of how the invention might be put into effect, so that the specific form and arrangement of the various features as shown is not to be understood as limiting on the invention.

BRIEF DESCRIPTION OF THE DRAWINGS

In the drawings:

FIG. 4 is a view of an end portion of a lumbar support in accordance with one embodiment of the invention showing the drive connection between movable and fixed parts of that end portion.

FIG. 5 is a perspective view of part of the arrangement shown FIG. 4.

FIG. 9 s a schematic view of a seat sub-assembly incorporating the lumbar support sub-assembly of FIG. 6.

DETAILED DESCRIPTION OF THE PREFERRED EMBODIMENTS

Figure 1:
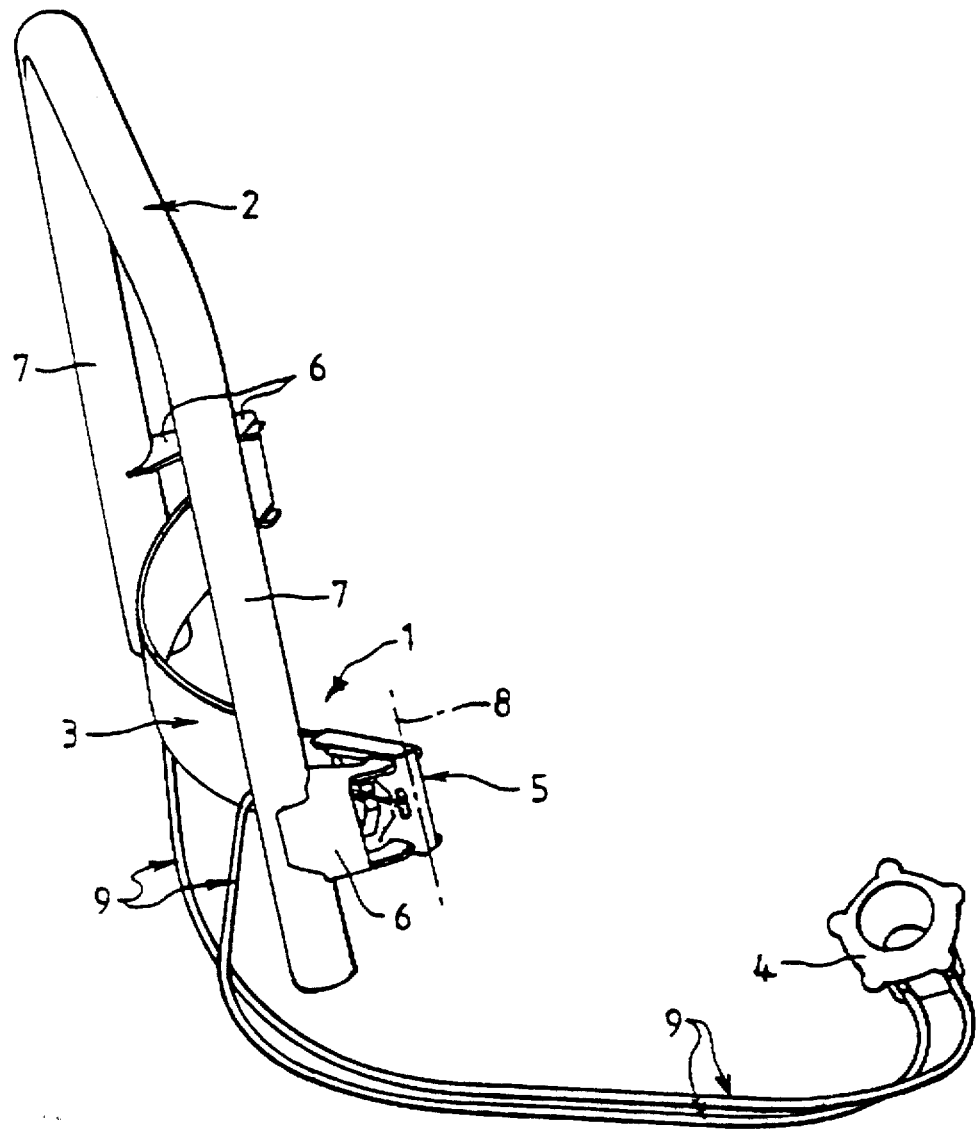
FIG. 1 is a schematic view of a seat sub-assembly including on embodiment of the invention.

FIG. 1 shows an adjustable lumbar support sub-assembly 1 attached to the frame 2 of a seat back rest. In the particular sub-assembly shown, the operative component of the lumbar support is a flexible strap-like member or band 3 which is adjustable lengthwise so as to vary the degree to which it curves rearwardly as shown. The operative component shown in the drawings is not the only form of operative component to which the invention can be applied. Furthermore, FIG. 1 shows a mechanical actuator 4 for the adjustment mechanism, whereas other types of actuators could be used such as an electrical actuator.

Any suitable means may be employed to mount the band 3 on the frame 2. In the arrangement shown, each of the two opposite ends of the band 3 is connected to a mounting unit 5 which is cooperable with a bracket 6 fixed to a respective one of the side members 7 of the frame 2. It is preferred that the cooperation between each unit 5 and the respective bracket 6 is such that the unit 5 can pivot about an axis 8 as shown in FIG. 1. It is also preferred that each unit 5 is conveniently detachable from its respective bracket 6 so that the sub-assembly 1 can be easily attached to and removed from the seat frame 2.

In the particular arrangement shown, the actuator 4 is connected to each end mounting of the band 3 through a respective flexible cable 9, but in an alternative arrangement there may be such a connection with one end only of the band 3. Each cable 9 is of a conventional form having an outer tubular cover and a wire core slidable axially within the cover and extending beyond each end of the cover. Each wire core can be connected to the actuator 4 in any appropriate fashion, including the various attachments described in Patent Application PCT/AU92/00503.

Each cable 9 constitutes a force transmitting element in that it responds to operation of the actuator 4 in a way such as to apply a force to the respective end of the band 3 and thereby cause movement of that end relative to the frame 2. In conventional arrangements, as shown diagrammatically in FIG. 2, the cable cover 10 forms a static part of the force transmitting element and the cable core 11 forms a dynamic part in that it moves with the respective end of the band 3.

A lumbar support according to the present invention could utilize cables 9 of the push-pull type, but it is generally preferred to utilise a flexible core 11 (e.g., a multi-strand wire) so that it is effective to positively transmit a force to the band 3 in one direction only—in particular, the pull direction. That is, each cable 9 operates in a positive or active manner to cause a reduction in the rearward curvature of the band 3, but not the reverse. When the actuator 4 is operated to relax each cable 9, the ends of the band 3 are able to move inwards towards one another to the extent permitted by the degree of adjustment of the cables 9, but actual inward movement of those ends may not occur except in response to a force applied to the mid region of the band 3, such as by pressure applied to the seat back rest by the occupant of the seat.

Figure 2:
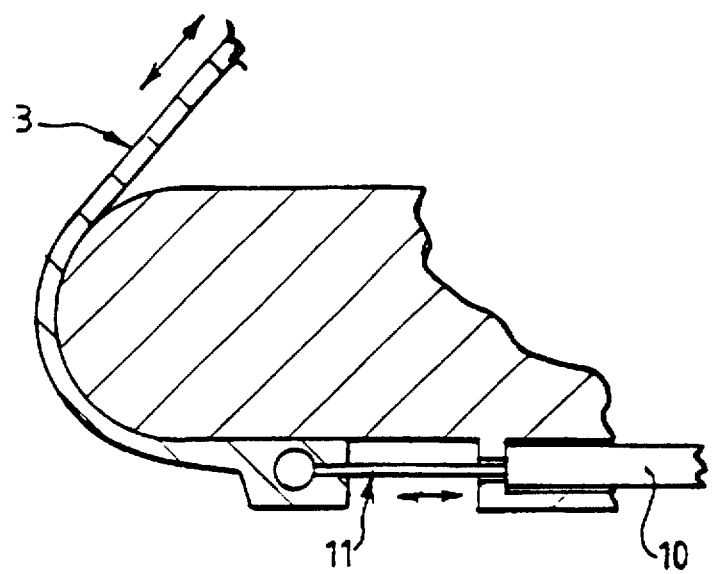
FIG. 2 is a diagrammatic view of a prior art arrangement.
Figure 3:
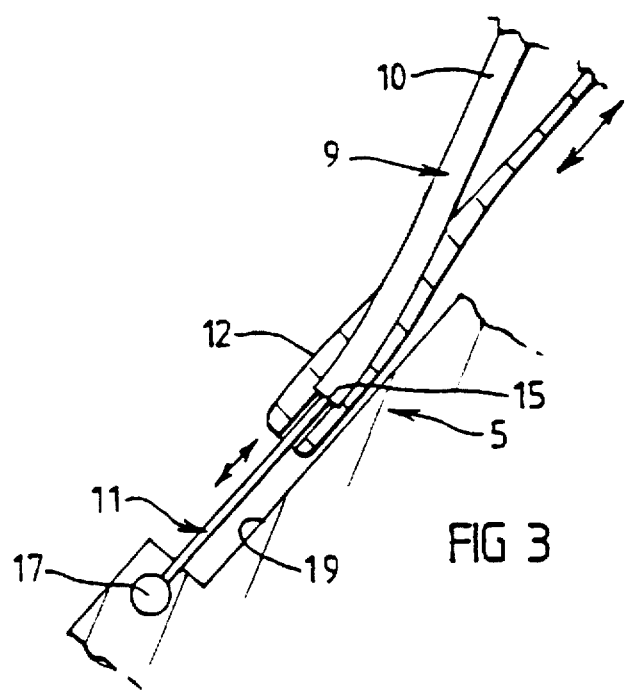
FIG. 3 is a diagrammatic view similar to FIG. 2 but showing an arrangement in accordance with the present invention.
Figure 6:
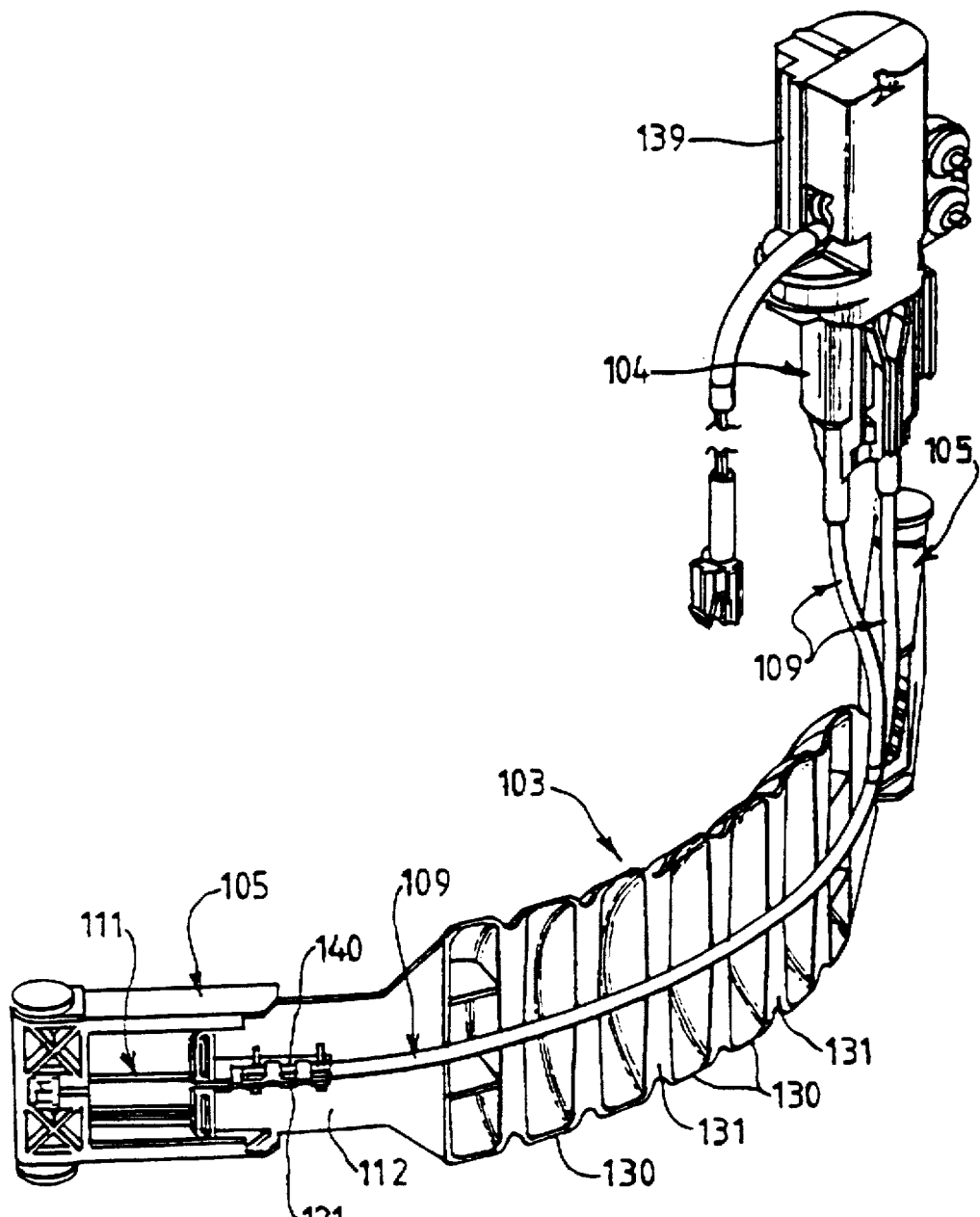
FIG. 6 is a schematic view of a lumbar support sub-assembly incorporating another embodiment of the invention.

Attachment of each cable 9 to a respective end mounting of the band 3 involves a novel approach which has advantages over the conventional approach shown in FIG. 2. FIGS. 3 and 4 show one form of the novel attachment, which is characterized in that the cable cover 10 forms a dynamic part of the actuating mechanism and the cable core 11 forms a static part. In that respect the terms "dyanamic" and "static" are intended to relate only to adjustment movement of the ends of the band 3.

As best seen in FIG. 4, each end portion 12 of the band 3 is arranged on its respective mounting unit 5 so as to be slidable relative thereto in the longitudinal direction of the band 3. Although it is preferred to have such a sliding arrangement at each end of the band 3, the invention is applicable to an arrangement in which only one end of the band 3 is so movable. Any suitable guide means can be provided on the unit 5 to ensure that the band end portion 12 is kept to a predetermined path of movement.

In the arrangement shown, an end portion 13 of the cable cover 10 is connected to the band end portion 12 so that at the point of connection the longitudinal axis of the cable 9 extends generally parallel to the longitudinal axis of the band 3. Furthermore, the connection is such that an exposed portion of the core 11 extends beyond the end of the band 3 for connection to the mounting unit 5 as hereinafter described. The connection between the end portions 12 and 13 can be effected in any appropriate manner. By way of example, the cable end portion 13 may be snap engaged within a cooperative recess 14 formed in the band end portion 12. In that regard, the band 3 may be formed by moulding a suitable plastics material such as an elastomeric polymer.

The connection between the cable cover 10 and the band 3 is such that the terminal end 15 (FIG. 3) of the cable cover 10 is held against movement beyond the connected position towards the adjacent terminal end 16 of the band 3. That may be achieved as shown by the cover terminal end 15 abutting against an opposed shoulder of the band end portion 12. It is to be understood however, that the desired effect could be achieved by having any appropriate transverse surface of or fixed to the cover 10 arranged in engagement with an abutment fixed to or formed integral with the band 3.

In the arrangement shown, a trunnion 17 is secured to the terminal end of the cable core 11 and is located in a cooperable cavity 18 formed in part of the mounting unit 5 which is spaced from the band terminal end 16 in the longitudinal direction of the band 3. The arrangement is such that tension applied to the cable core 11 is reacted into the mounting unit 5, and is further reacted into the band end portion 12 through interaction between that end portion and the cover end 15. Such tension therefore tends to draw the band end 16 towards the cable trunnion 17, which is effectively retained against movement relative to the mounting unit 5. Thus, for the purposes of adjusting the band 3 in one direction, the cable core 11 functions as a static part of the adjustment mechanism, whereas the cable cover 10 functions as a dynamic part because of its movement with the band 3 relative to the mounting unit 5.

FIG. 5 shows a variation in the arrangement of the band end portion 12 in which the end portion 13 of the cable cover 10 is of greater length than that shown in FIG. 4, and is located in a tunnel 20 formed in the band end portion 12. The length LT of the tunnel 20 is selected to be no less than the maximum extension EX of the cable core 11 beyond the end 15 of the cover 10. That guards against the cable cover 10 being inadvertently dislodged from its connection with the band end portion 12. Preferably, the length LT is greater than EX, for example by 5 mm or thereabouts. The cable cover 10 is preferably a sliding fit in the tunnel 20.

An advantage of the FIG. 5 arrangement is that it enables the normal end fittings to be eliminated from the cable 10. Those end fittings, which are applied to conventional flexible cables of the kind referred to, add significantly to the cost of the cable so their elimination has a substantial cost advantage.

Another feature of the FIG. 5 arrangement is the provision of a slot 21 which permits the cable core 11 to be attached to the band 3 and to the mounting unit 5 while the trunnion 17 is in place at the end of the cable core 11. The width of the slot 21 is selected to be less than the diameter of the cover 10, but sufficient to allow passage of the core 11.

A particular advantage of an arrangement of the kind described in relation to FIGS. 3, 4 and 5, is that the band end portion 12 slides over a substantially flat surface rather than being forced around a relatively small radius bend as in the prior art arrangement of FIG. 2. Frictional resistance to adjustment of the band 3 is therefore greatly reduced and the force required to effect adjustment is reduced accordingly. Furthermore, the new arrangement will generally allow for a greater degree of adjustment than that which is available with the FIG. 2 arrangement.

It is to be appreciated that the surface 19 (FIG. 3) over which the band end portion 12 slides, need not be flat as shown in FIG. 3. That surface could be curved or otherwise configured. Furthermore, the invention would operate satisfactorily in circumstances where the band 3 is required to be turned around a relatively sharp bend as shown in FIG. 2.

FIGS. 6 to 9 show another embodiment of the invention in which the actuator for causing adjustment of the lumbar support is power driven. Components of the FIGS. 6 to 9 embodiment which correspond to components of the previously described embodiment will be given like reference numerals except that they are in the number series 100 to 199.

The band 103 of the FIGS. 6 to 9 embodiment may be moulded or otherwise formed from a suitable plastics material and has a number of curved sections 130 provided along part of its length. A flexible hinge-like web 131 connects each two adjacent curved sections 130 so as to minimise resistance to changes in the degree to which the band 103 curves rearwardly.

Figure 7:
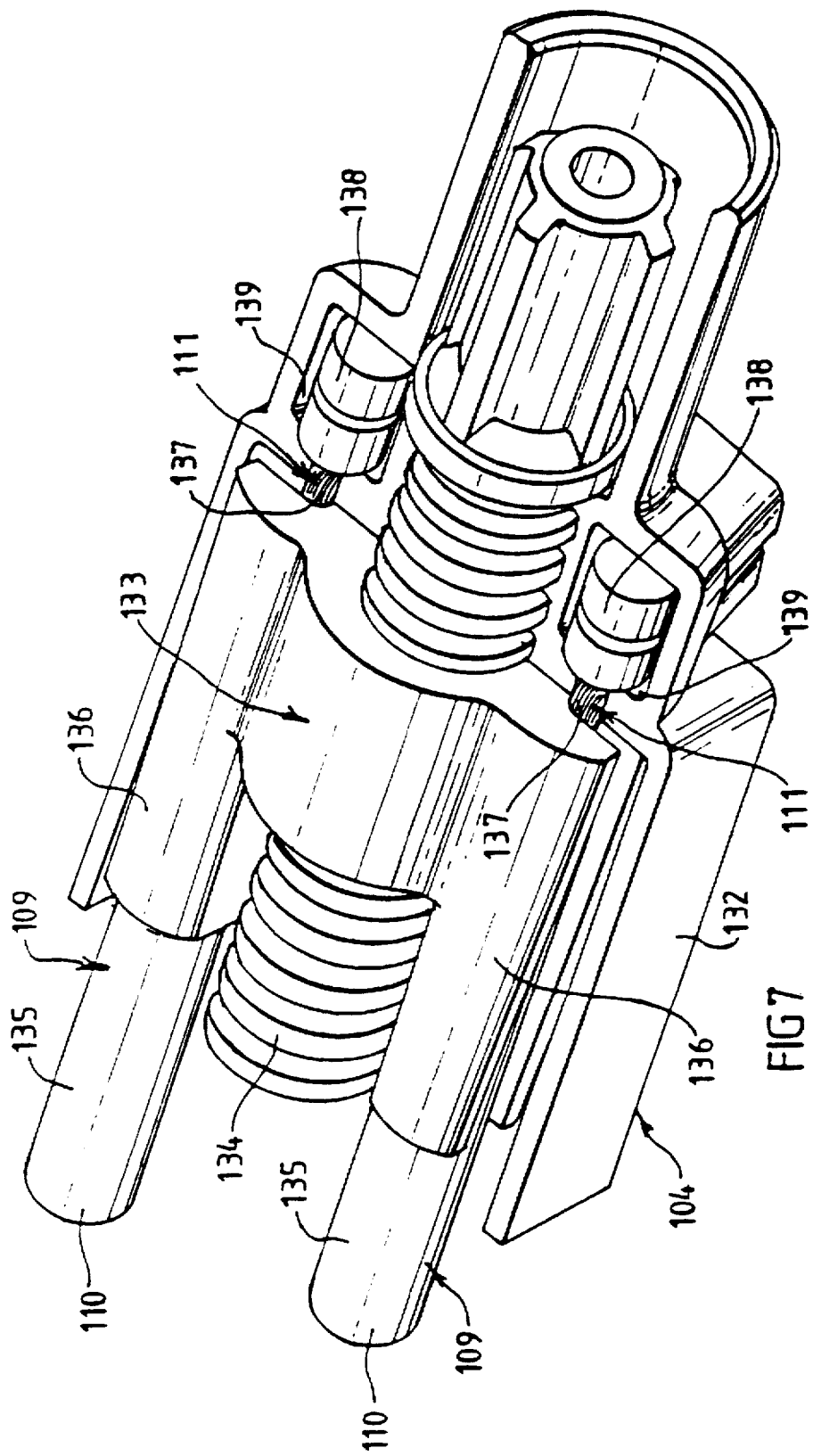
FIG. 7 is a partially sectioned view of one form of actuator which is usable with the embodiment of FIG. 6.

An actuator 104 is connected to one end of each of the two cables 109, and the other end of each cable 109 is connected to a respective one of the opposite ends of the band 103 as hereinafter described. The actuator 104 can be of any suitable construction, and an example construction is shown by FIG. 7. In the FIG. 7 construction the actuator 104 includes a housing 132, a carriage 133 located within the housing 132 for relative movement, and a screw threaded drive spindle 134 which interacts with both the housing 132 and the carriage 133. The spindle 134 cooperatively engages with an internal thread of the carriage 133, and the arrangement is such that rotation of the spindle 134 causes the carriage 133 to move relative to the housing 132 in the axial direction of the spindle 134.

The end portion 135 of each cable cover 110 is located within a respective hollow section 136 of the carriage 133 as shown. An end portion 137 of the core 111 of each cable 109 extends beyond the respective cover 110 and has a trunnion 138 fixed to its terminal end. Each trunnion 138 is held captive within a respective pocket 139 of the housing 132 so as to be held against movement towards the carriage 133. Thus, rotation of the spindle 134 in one direction causes the cable covers 110 to be moved away from the core trunnions 138, whereas rotation in the opposite direction allows the covers 110 to move towards the trunnions 138. Rotation of the spindle 134 is effected through operation of an electric motor 139 (FIG. 6), and the spindle 134 and motor 139 can be operatively connected in any suitable fashion for that purpose.

Figure 8:
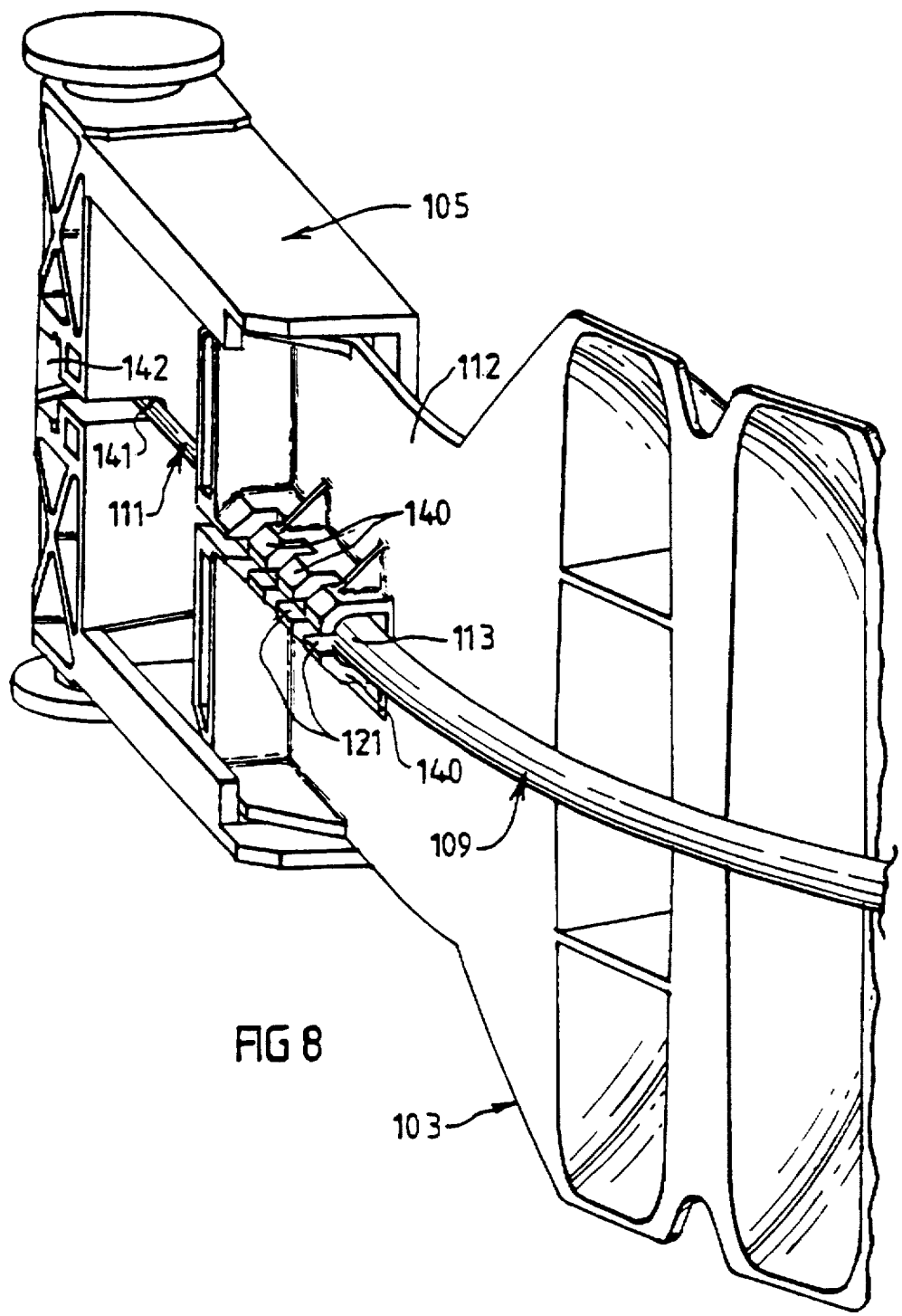
FIG. 8 is an enlarged view of an end portion of the adjustable lumbar support of FIG. 6.

As best seen in FIG. 8, each of the cable cover end portions 113 which is remote from the actuator 104 is connected to a respective end portion 112 of the band 103 in a manner similar to that described in relation to FIGS. 2 to 5. In particular, each end portion 113 is located within a hollow tunnel, although in the FIG. 8 arrangement the tunnel is divided into discrete sections each of which is formed within a respective lug 140 formed integral with or connected to the band 103. Each lug 140 has an access slot 121 for the wire core 111.

The end portion 141 of the core 111 which extends beyond the tunnel lugs 140 has a trunnion (not shown) fixed to its terminal end, and that trunnion locates within a pocket 142 formed within a mounting unit 105. The band end portion 112 is slidably mounted on a flat surface of the mounting unit 105, and the unit 105 is pivotally connected at 143 to a bracket 106 which, as shown in FIG. 9, is fixed to a respective side member 107 of a back rest frame 102.

Operation of the embodiment of FIGS. 6 to 9 is essentially the same as described in connection with the embodiment of FIGS. 3 to 5.

Various alterations, modifications and/or additions may be introduced into the constructions and arrangements of parts previously described without departing from the spirit or ambit of the invention as defined by the appended claims.

I claim:

1. An adjustable lumbar support for a seat back rest, comprising
   an elongate flexible band having first and second end portions connectable to opposed frame members of the seat back rest, said band projecting with a rearward curvature between the opposed frame members;
   an adjustment mechanism including a flexible cable having a wire core and a tubular cover slidably assembled on said core, said cover having a first end portion connected to and extending longitudinally in substantially parallel relationship to said first end portion of said band;
   stop means for preventing movement of said first end portion of said cover relative to said band in at least a first direction away from said second end portion of said band;
   said wire core having an end portion extending in said first direction beyond said first end portion of said cover and being connectable to and adjacent one of the opposed frame members of the seat back rest; and
   an actuator connected to a second end portion of said cover, said actuator controlling movement of said cover and said end portion of said band longitudinally relative to said core and thereby varying said rearward curvature of said band.

2. A lumbar support according to claim 1, wherein said actuator includes means for moving said cover longitudinally relative to said core in said first direction so that said first end portion of said band is moved away from said second end portion of said band to thereby reduce said rearward curvature of said band, and means for enabling said cover to move relative to said core in a second direction opposite said first direction so that said first end portion of said band is movable toward said second end portion of said band to thereby increase said rearward curvature of said band.

3. A lumbar support according to claim 2, wherein said stop means includes an abutment on said first end portion of said band and a transverse surface on said first end portion of said cover engagable with said abutment.

4. A lumbar support according to claim 3, wherein said abutment is located at an end of a tunnel formed in said first end portion of said band, said first end portion of said cover being slidably engaged within said tunnel.

5. A lumbar support according to claim 1, further comprising a mounting unit connected to said first end portion of said band for connecting said first end portion of said band to the seat back rest, said first end portion of said core being connected to said mounting unit.

6. A lumbar support according to claim 5, wherein said first end portion of said band is slidably mounted to said mounting unit for movement relative thereto in the longitudinal direction of said band.

7. A lumbar support according to claim 6, wherein said first end portion of said band slidably engages a substantially flat surface of said mounting unit.

8. A lumbar support according to claim 1, wherein said band includes a plurality of curved sections arranged serially along the length of said band, adjacent ones of said curved sections being interconnected by a flexible web.

9. A lumbar support according to claim 1, wherein said stop means prevents said first end portion of said cover from moving relative to said band in said first direction beyond an actuation point, but permits movement of said first end portion of said cover relative to said band in a second direction toward said second end portion of said band.

10. A lumbar support according to claim 1, further comprising another flexible cable connected to said second and portion of said band, said another flexible cable having a wire core and a tubular cover slidably assembled on said core, said cover having a first end portion connected to and extending longitudinally in substantially parallel relationship to said second end portion of said band, and stop means for preventing movement of said first end portion of said cover of said another flexible cable relative to said band in at least a second direction opposite said first direction, said wire core having an end portion extending in said second direction beyond said first end portion of said cover of said another flexible cable and being connectable to another one of the opposed frame members of the seat back rest.

11. A lumbar support according to claim 10, further comprising a second actuator connected to a second end portion of said cover of said another flexible cable, said second actuator being operable to control movement of said cover longitudinally relative to said core to thereby further vary said rearward curvature of said band.

12. A lumbar support according to claim 11, wherein said second actuator includes means for moving said cover of said another flexible cable longitudinally relative to said core in said second direction so that said second end portion of said band is moved away from said first end portion of said band to thereby reduce said rearward curvature of said band, and means for enabling said cover of said another flexible cable to move relative to said core in said first direction so that said first end portion of said band is movable toward said first end portion of said band to thereby increase said rearward curvature of said band.

13. A lumbar support according to claim 10, wherein said actuator is further connected to a second end portion of said cover of said another flexible cable, said actuator being further operable to control movement of said cover longitudinally relative to said core to thereby further vary said rearward curvature of said band.

14. A lumbar support according to claim 13, wherein said actuator includes means for moving said cover of said another flexible cable longitudinally relative to said core in said second direction so that said second and portion of said band is moved away from said first end portion of said band to thereby reduce said rearward of said band, and means for enabling said cover of said another flexible cable to move relative to said core in said first direction so that said second end portion of said band is movable toward said first end portion of said band to thereby increase said rearward curvature of said band.

15. A seat sub-assembly, comprising a seat back rest having a pair of laterally-spaced frame members;

an adjustable lumbar support including an elongate flexible band extending longitudinally between said frame members, said band having a first end portion connected to one of said frame members and a second end portion connected to another one of said frame members, said band projecting with a rearward curvature between said frame members;

an adjustment mechanism including a flexible cable having a tubular cover with a first end portion connected to said band, a wire core slidable longitudinally within said cover, and stop means on one of said end portions of said band for preventing movement of said first end portion of said cover relative to said band in at least a first direction longitudinal of said band, said wire core having an end portion extending in said first direction beyond said first end portion of said cover and being connected at an attachment point to an adjacent one of said frame members; and an actuator connected to a second end portion of said cover remote from said first end portion, said actuator controlling movement of said cover and said one of said end portions of said band longitudinally relative to said core thereby varying said rearward curvature of said band.

16. A sub-assembly according to claim 15, wherein said actuator includes means for moving said cover longitudinally relative to said core in said first direction and for enabling said cover to move longitudinally relative to said core in a second direction opposite said first direction to thereby vary said rearward curvature of said band.

17. A sub-assembly according to claim 15, wherein a tunnel is formed in said first end portion of said band, said first end portion of said cover being slidably engaged within said tunnel, and said stop means includes an abutment located at an end of said tunnel and a transverse surface on said firsts end portion of said cover engagable with said abutment.

18. A sub-assembly according to claim 15, further comprising a bracket fixedly connected to each of said frame members, said first end portion of said band being pivotally connected to one of said brackets and said second end portion of said band being pivotally connected to another one of said brackets.

* * * * *

UNITED STATES PATENT AND TRADEMARK OFFICE
CERTIFICATE OF CORRECTION

PATENT NO. : 5,788,328
DATED : August 4, 1998
INVENTOR(S) : Mark Andrew Lance

It is certified that error appears in the above-identified patent and that said Letters Patent is hereby corrected as shown below:

In the Abstract, line 4 "rest and least" should read --rest at at least--.

Column 2, line 49, "on" should read --one--.

Column 2, line 60, "shown FIG. 4." should read --shown in FIG. 4.--.

Column 6, line 46 "to and adjacent" should read --to an adjacent--.

Column 7, line 55 "said first end" should read --said second end--.

Column 8, line 6, "second and portion" should read --second end portion--.

Column 8, line 8, "rearward of" should read --rearward curvature of--.

UNITED STATES PATENT AND TRADEMARK OFFICE
CERTIFICATE OF CORRECTION

PATENT NO. : 5,788,328
DATED : August 4, 1998
INVENTOR(S) : Mark Andrew Lance

It is certified that error appears in the above-identified patent and that said Letters Patent is hereby corrected as shown below:

Column 8, line 39, "core thereby" should read --core, thereby--.

Column 8, line 52, "said firsts end" should read --said first end--.

Signed and Sealed this

Third Day of November, 1998

*Attest:*

BRUCE LEHMAN

*Attesting Officer*        Commissioner of Patents and Trademarks